W. J. McCOURT & M. W. COGHLAN.
WATER METER.
APPLICATION FILED AUG. 30, 1909.

1,034,479.

Patented Aug. 6, 1912.

2 SHEETS—SHEET 1.

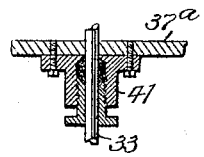
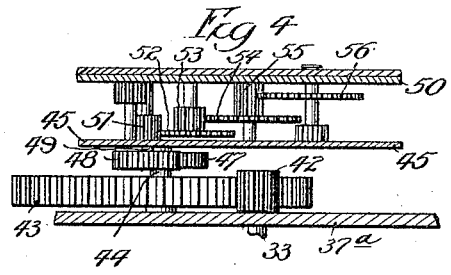
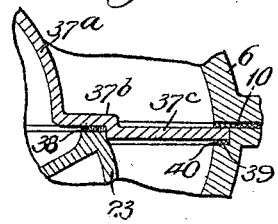
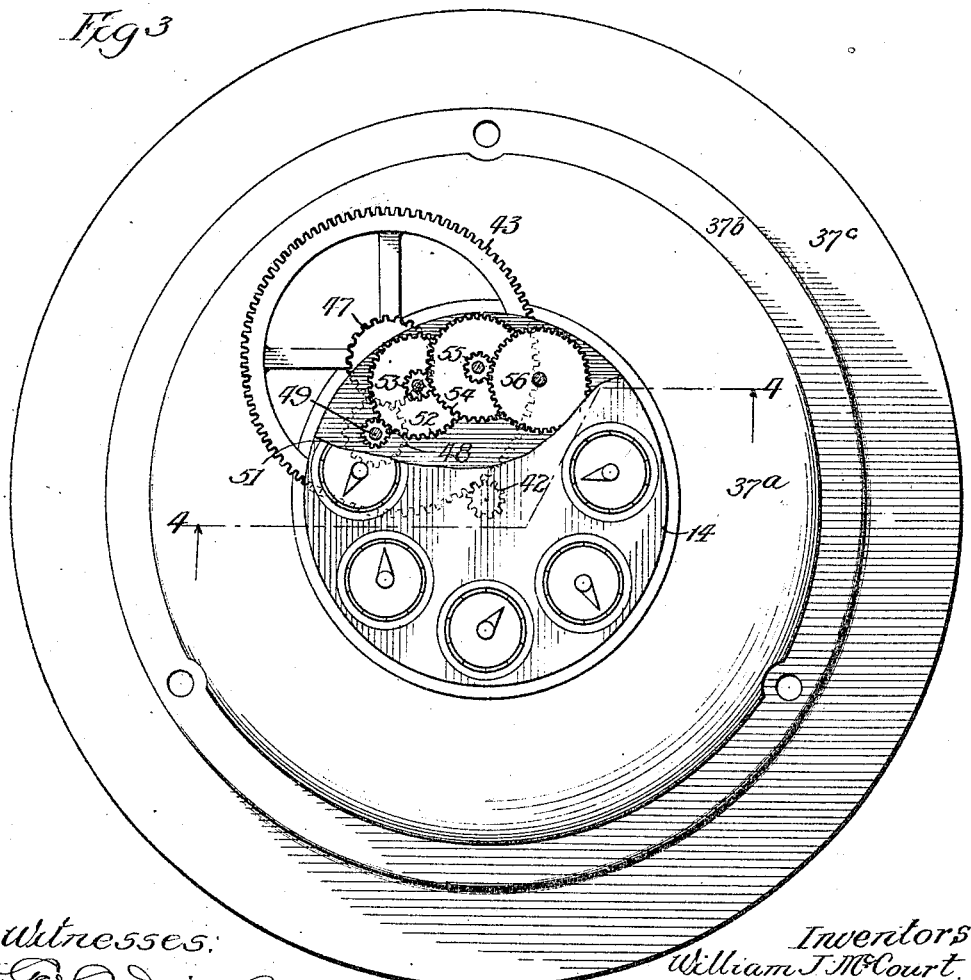

UNITED STATES PATENT OFFICE.

WILLIAM J. McCOURT AND MICHAEL W. COGHLAN, OF CHICAGO, ILLINOIS.

WATER-METER.

1,034,479.  Specification of Letters Patent.  Patented Aug. 6, 1912.

Application filed August 30, 1909. Serial No. 515,204.

*To all whom it may concern:*

Be it known that we, WILLIAM J. MC-COURT and MICHAEL W. COGHLAN, both citizens of the United States, and residents of Chicago, in the county of Cook and State of Illinois, have invented certain new and useful Improvements in Water-Meters, of which the following is a specification.

Our invention relates to that type of meter devices extensively employed in connection with measured water service, and has for its main objects to simplify and improve the construction of such devices, to increase their degree of accuracy, to render them less liable to injury and damage through access of water to any portion of the meter gear train, or through access of hot water to the piston chamber, and to render them more nearly proof against fraudulent manipulation by dishonest consumers.

Other minor objects and advantages of the invention will be readily apparent to those skilled in the art from an inspection of the accompanying drawings forming a part of this specification and illustrating one practical form in which the improvements constituting our invention may be embodied, and in which,—

Figure 1:
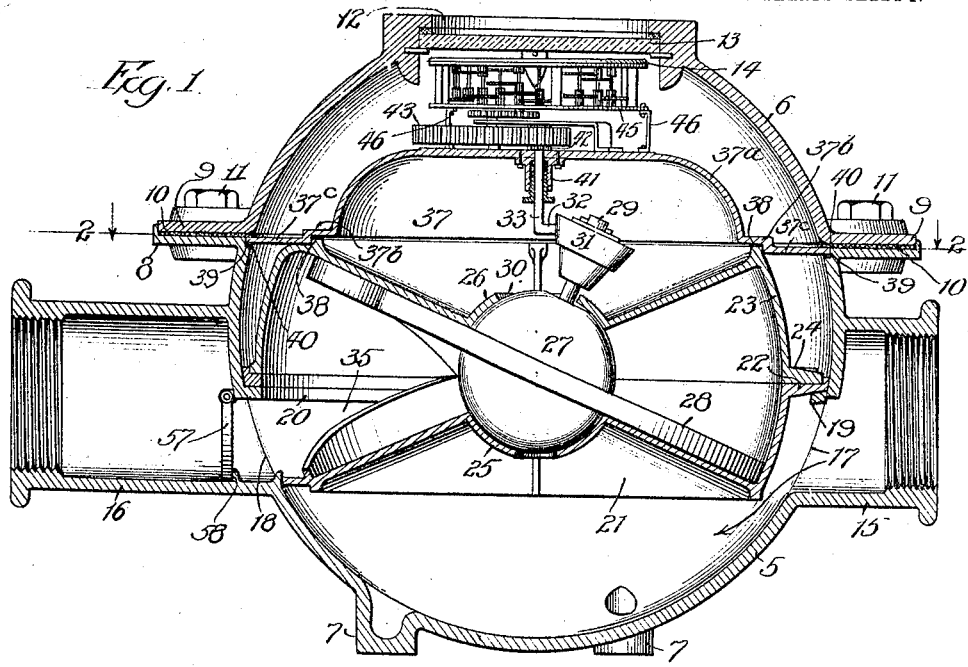
Figure 2:
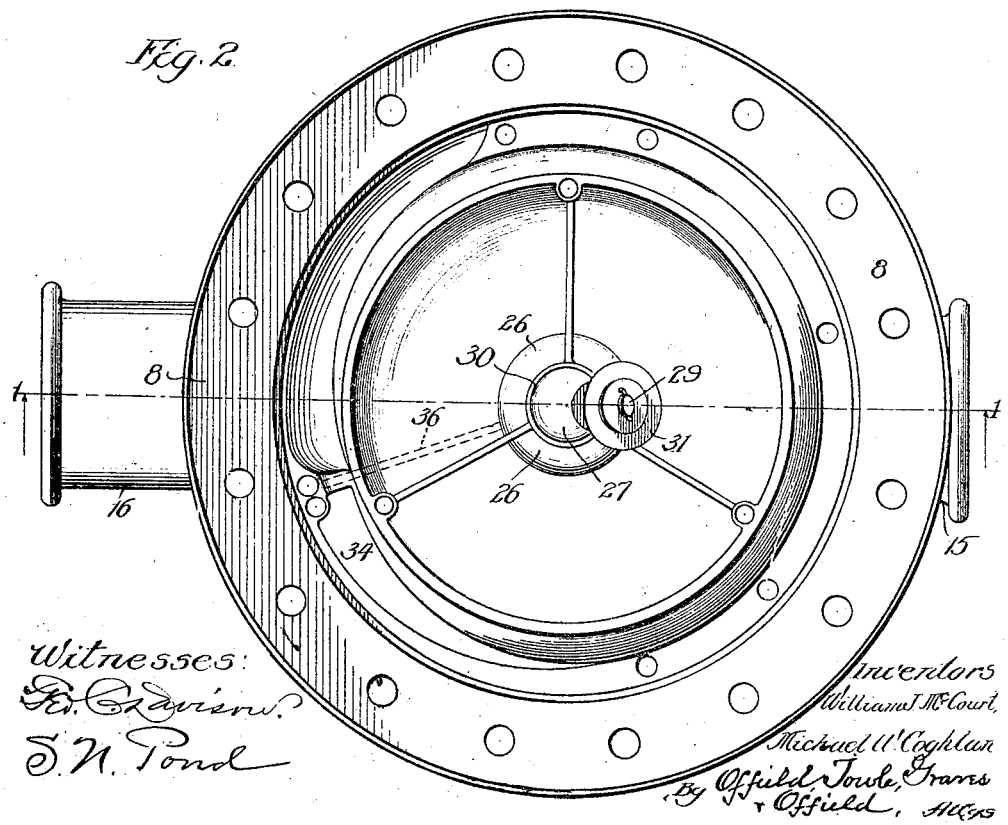

Figure 1 is a central vertical section on line 1—1 of Fig. 2 through the meter casing and its inlet and outlet passages, with the wabbling piston and registering mechanism appearing in side elevation. Fig. 2 is a top plan view of the parts appearing below the line 2—2 of Fig. 1. Fig. 3 is a top plan view of the registering mechanism with the cap or cover of the housing removed and the dial face of the meter partly broken away to fully disclose the speed-reducing gear train. Fig. 4 is a detail of the speed-reducing gear train in side elevation, in section through its containing-frame on line 4—4 of Fig. 3. Fig. 5 is an enlarged detail view in elevation of the detachable packed bearing boss of the main driving shaft of the meter; and Fig. 6 is an enlarged sectional detail of a portion of the partition plate which protects the gear trains of the meter from the water, more particularly showing the water-tight joints thereof.

Referring to the drawings, 5 designates the body portion and 6 the dome-shaped cover of a substantially spherical housing or casing which contains the measuring device and registering mechanism and their connections. The body member 5 has formed integral therewith suitable supporting legs 7 and, surrounding its upper edge, a broad horizontal flange 8 adapted to register with a corresponding flange 9 of the cover 6, the two being securely united, with an interposed gasket 10, by means of bolts 11. The cover 6 has a central opening 12, covered by a glass disk 13, directly beneath which is the dial face 14 of the register-clock. The body member 5 of the casing has integral therewith the inlet and outlet nozzles 15 and 16, respectively, communicating freely with the inlet and discharge ports 17 and 18, formed through the wall of the housing at diametrically opposite points, and interiorly threaded to form couplings with the usual water-supply pipe (not shown).

It will be noted that the coupling-nozzles 15 and 16 are of unequal lengths, the nozzle surrounding the inlet port being shortened by an amount which is added to the nozzle which surrounds the discharge port to accommodate a check-valve in the latter (hereinafter described); this change being made without varying the length over all of the standard meter from the face of the inlet to the face of the outlet coupling-nozzle. This construction not only affords room for a check-valve in the discharge coupling-nozzle without increasing the standard length over all of the meter, but it affords a ready means of detecting attempted fraud by turning the meter around, since an inspector upon finding the longer coupling-nozzle connected to the inlet pipe, would know that the meter had been tampered with.

Cast on the inner surface of the body member 5 at intervals are inwardly projecting lugs or ledges, indicated at 19 and 20, that form a support for the piston chamber. This latter is, as usual, made in two horizontal sections, the lower section 21 having an external horizontal flange 22 by which it is supported upon and secured to the lugs or ledges 19 and 20, and the upper section 23 having a corresponding mating flange 24 resting upon and bolted to the flange 22 of the lower section. The two sections of the piston chamber are formed with the usual central concave seats 25 and 26, which together form a bearing for the spherical hub 27 of the piston disk 28. The hub 27 has an axial spindle 29 that projects through a central opening 30 in the upper bearing member 26, and carries the usual conical anti-friction roller 31, that drivingly engages a horizontal arm 32 on the lower end of a vertical shaft 33, through which the movement of the piston is transmitted to the superposed registering mechanism.

The water flows in through the nozzle 15 and admission port 17 to the space below and around the piston chamber, entering the latter through the admission port 34 (Fig. 2), flowing thence through the piston chamber and actuating the piston, and emerging from the latter through a port 35 (Fig. 1), flowing thence through the outlet port 18 of the casing and the outlet nozzle 16; it being understood that the inlet and outlet ports 34 and 35 of the piston chamber are separated by a vertical radial partition, indicated by dotted lines at 36 in Fig. 2, the piston disk 28, having a radial slot straddling this partition.

The mechanism as thus far described, with the exception of the glass top on the cover and the location of the register-clock beneath said glass top and the unequal lengths of coupling-nozzles, is an old and well known form of meter-actuating mechanism. An objection, however, that inheres therein is found in the tendency of the water to flow upwardly around the flange 22 of the piston chamber and through the opening 30 from the interior of the latter, thus flooding the entire casing, and necessitating the making of the gears of the speed-reducing gear-train wholly of brass or some other rust-proof material; and, furthermore, particles of sand and grit carried by the water become lodged in and more or less clog and interfere with the gearing, rendering the mechanism liable to get out of order and inaccurately measure the flow of the water. A leading feature of our present invention resides in means whereby we effectively seal both the speed-reducing and register-clock gear trains of the mechanism from the water. This means comprises chiefly a partition member 37 having a central dome-shaped portion 37$^a$, a narrow intermediate annular flat portion 37$^b$ surrounding the lower edge of the dome-shaped portion 37$^a$, and a downwardly offset outer annular portion 37$^c$. The intermediate portion 37$^b$ seats upon the upper edge of the piston chamber, forming a water-tight joint therewith through the agency of an interposed gasket 38 (Fig. 6); and the outer annular portion 37$^c$ spans the space between the upper edge of the piston chamber and the upper edge of the body section 5 of the outer casing, this latter being preferably counterbored to form a ledge or shoulder 39 on which the outer edge of the said partition may seat in a water-tight manner through the agency of an interposed gasket ring 40. It will thus be seen that the annular parts 37$^b$ and 37$^c$ constitute an effective seal against the upward flow of the water around the piston chamber. Heretofore, in lieu of the partition 37 above described, there has been employed merely a spider resting upon the upper edge of the piston chamber and constituting a support for the superposed speed-reducing gear train. The dome-shaped portion 37$^a$ herein shown is solid or imperforate, except for a single central aperture which accommodates the shaft 33. The bearing of the hub 27 in its seat 26 is not water-tight; and, of course, considerable water leaks through said bearing and the central opening 30 into the space between the upper side of the piston chamber and the superposed partition member 37. To prevent leakage of water past the latter around the shaft 33, we provide the latter with a packed bearing in the form of a stuffing box 41, which, as best shown in the detail view Fig. 5, is removably secured to the under side of the dome 37$^a$ around the shaft 33, and effectively prevents the escape of water through the bearing of said shaft in said dome. From the foregoing it will be seen that by the means above described the space between the partition member 37 and the cover 6 of the outer casing is effectively sealed against access of water.

The upper end of the driving shaft 33 has fast thereon a pinion 42 which meshes with and drives a spur gear 43, the shaft 44 of which is journaled in and between the member 37$^a$ and the lower frame-plate 45 of the register-clock gear train, this latter being rigidly supported on the member 37$^a$ in any suitable manner, as by legs 46. Fast on the shaft 44, above the spur gear 43, is a smaller gear 47, which, in turn, meshes with and drives a still smaller gear 48 that is fast on the lower end of a short shaft 49 journaled in the plate 45. The upper end of the shaft 49, between the lower and upper frame-plates 45 and 50 of the clock frame carries a pinion 51, which, through a train of intermediate gears and pinions 52, 53, 54, 55, and 56, actuates the spindle of the units hand or pointer of the register-clock. In meters of this type it has heretofore been customary to interpose a reducing train of gears of substantially the extent herein shown wholly between the shaft 33 and the lower frame-plate of the register-clock. By locating the greater part of this reducing train within the frame of the register-clock itself, we effect a considerable economy both of material and space, since it allows the register-clock, as well as the speed-reducing gear train, to be set wholly within instead of above the main casing of the meter, thus reducing the height of the meter, and also, as we have demonstrated by careful tests, affords increased accuracy in the measurement of the water, especially under light pressures and small streams.

In the outlet nozzle 16 we provide a check valve shown at 57, which may be of any suitable form or type that will permit the water to flow outwardly but will automatically arrest any flow of water in the opposite direction. The valve herein shown is a simple hinged valve mounted across the mouth of the outlet port 18 and adapted to close against a stop 58 formed on the bottom wall of the nozzle.

The operation of the meter is generally similar to that of meters of this type on which our present improvements are based; but the advantages resulting from these improvements, as already briefly pointed out are, first, by reason of the solid partition 37 extending entirely across the interior space of the outer casing above the piston chamber, with the bearing of the shaft 33 rendered water-tight by the stuffing box, the gear trains are preserved from injury through contact with the water; second, by making the stuffing box, which also serves in part as a bearing for the shaft 33, detachable, wear or injury thereof does not necessitate the discarding of the entire part to which it is attached and its location wholly on the underside of the partition member enhances the vertical compactness of the meter; third, the presence of the check valve in the outflow nozzle renders futile any attempt to "beat" the device by reversing its position in the water pipe, and also saves the piston from injury by the backing up of hot water; and, finally, the described arrangement and location of the speed-reducing gear train enhances the accuracy, and makes it practicable to house the register-clock within the main casing containing the measuring device.

Without, therefore, confining ourselves to the exact details of construction and arrangement shown and described, we claim:

1. In a water meter, the combination with an outer casing comprising a body portion having supply and discharge ports and an internal annular ledge at its upper end, and a cover therefor provided with a glass top, of a measuring device located in said body portion and having an upper annular edge spaced inwardly from said annular ledge of the outer casing, an imperforate partition member comprising a central dome-shaped portion above said measuring device, an intermediate flat annular portion resting upon and forming a water-tight joint with the annular upper edge of said measuring device, and an outer annular portion spanning the space between the upper edge of said measuring device and the opposite inner wall of said outer casing and at its outer edge resting upon and forming a water-tight joint with said annular ledge, and a registering mechanism mounted on the central dome-shaped portion of said partition directly beneath the glass top of said cover, substantially as described.

2. In a water meter, the combination with a substantially spherical outer casing comprising a body portion having diametrically opposite supply and discharge ports and an internal annular ledge at its upper end, and a cover therefor provided with a glass top, of a measuring device located in said body portion and having an upper annular edge spaced inwardly from said annular ledge of the outer casing, an imperforate partition member comprising a central dome-shaped portion above said measuring device, an intermediate flat annular portion resting upon and forming a water-tight joint with the annular upper edge of said measuring device, and a downwardly offset outer annular portion spanning the space between the upper edge of said measuring device and the opposite inner wall of said outer casing and at its outer edge resting upon and forming a water-tight joint with said annular ledge, and a registering mechanism mounted on the central dome-shaped portion of said partition directly beneath the glass top of said cover, substantially as described.

In testimony that we claim the foregoing as our invention, we have hereunto subscribed our names in the presence of two witnesses.

WILLIAM J. McCOURT.
MICHAEL W. COGHLAN.

Witnesses:
SAMUEL N. POND,
MATTIE B. BLISS.